United States Patent
Tankov et al.

(10) Patent No.: US 7,594,237 B2
(45) Date of Patent: Sep. 22, 2009

(54) PROGRAM OBJECT TO SUPPORT CONNECTION GENERATION

(75) Inventors: Nikolai D. Tankov, Sofia (BG); Peter K. Matov, Velingrad (BG)

(73) Assignee: SAP AG, Walldorf (DE)

( * ) Notice: Subject to any disclaimer, the term of this patent is extended or adjusted under 35 U.S.C. 154(b) by 715 days.

(21) Appl. No.: 10/858,661

(22) Filed: Jun. 1, 2004

(65) Prior Publication Data

US 2005/0268276 A1    Dec. 1, 2005

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/316
(58) Field of Classification Search .................. 719/316
See application file for complete search history.

(56) References Cited

U.S. PATENT DOCUMENTS

| | | | |
|---|---|---|---|
| 5,613,114 A | 3/1997 | Anderson et al. | |
| 5,790,789 A | 8/1998 | Suarez | |
| 5,822,580 A * | 10/1998 | Leung | 707/103 R |
| 6,003,061 A | 12/1999 | Jones et al. | |
| 6,125,382 A | 9/2000 | Brobst et al. | |
| 6,233,585 B1 | 5/2001 | Gupta et al. | |
| 6,260,057 B1 | 7/2001 | Eykholt et al. | |
| 6,411,983 B1 | 6/2002 | Gallop | |
| 6,519,605 B1 | 2/2003 | Gilgen et al. | |
| 6,691,304 B1 | 2/2004 | Zhang et al. | |
| 6,721,777 B1 * | 4/2004 | Sharma | 718/101 |
| 6,766,349 B1 | 7/2004 | Belkan | |
| 6,778,990 B2 * | 8/2004 | Garcia et al. | 707/10 |
| 6,832,238 B1 * | 12/2004 | Sharma et al. | 709/201 |
| 6,886,041 B2 | 4/2005 | Messinger et al. | |
| 6,976,061 B1 * | 12/2005 | Sharma | 709/220 |
| 7,007,075 B1 | 2/2006 | Coffey | |
| 7,036,110 B2 | 4/2006 | Jeyaraman | |
| 7,036,124 B1 | 4/2006 | Patterson | |
| 7,080,119 B2 | 7/2006 | Felt et al. | |
| 7,089,317 B2 | 8/2006 | Jeyaraman et al. | |

(Continued)

OTHER PUBLICATIONS

Demichiel, Linda, et al., "JSR 220: Enterprise JavaBeans,Version 3.0, EJB Core Contracts and Requirements", *Sun Microsystems, EJB 3.0 Expert Group*, (May 2, 2006), Whole Document.

(Continued)

*Primary Examiner*—Li B Zhen
*Assistant Examiner*—KimbleAnn Verdi
(74) *Attorney, Agent, or Firm*—Schwegman, Lundberg & Woessner, P.A.

(57) ABSTRACT

A system and method for a program object to support generation of connections. An embodiment of a method comprises establishing a first program object, the program object being designated as an object factory for generation of a connection factory, the first program object acting as a proxy for all connection factory requests; receiving a request for a connection factory from a program application at the first program object; generating a request for the connection factory by the first program object; obtaining an instance of the connection factory; generating a connection using the connection factory; and deploying the connection between the computer application and an external resource using the generated connection.

37 Claims, 6 Drawing Sheets

U.S. PATENT DOCUMENTS

| | | | |
|---|---|---|---|
| 7,089,584 B1* | 8/2006 | Sharma | 726/4 |
| 7,493,628 B2* | 2/2009 | Potter et al. | 719/328 |
| 7,506,342 B2* | 3/2009 | Mousseau et al. | 719/320 |
| 7,516,447 B2* | 4/2009 | Marvin et al. | 717/140 |
| 2002/0046230 A1 | 4/2002 | Dieterich et al. | |
| 2002/0107872 A1* | 8/2002 | Hudis et al. | 707/104.1 |
| 2002/0144002 A1 | 10/2002 | Matena et al. | |
| 2003/0023599 A1* | 1/2003 | Garcia et al. | 707/10 |
| 2003/0074217 A1 | 4/2003 | Beisiegel et al. | |
| 2003/0093402 A1 | 5/2003 | Upton et al. | |
| 2003/0145074 A1 | 7/2003 | Penick | |
| 2003/0182426 A1 | 9/2003 | Hapner et al. | |
| 2003/0191803 A1 | 10/2003 | Chinnici et al. | |
| 2003/0229888 A1 | 12/2003 | Spotwood et al. | |
| 2003/0236923 A1 | 12/2003 | Jeyaraman et al. | |
| 2004/0015859 A1 | 1/2004 | Potter et al. | |
| 2004/0015974 A1 | 1/2004 | Jeyaraman | |
| 2004/0078495 A1* | 4/2004 | Mousseau et al. | 710/1 |
| 2004/0098726 A1* | 5/2004 | Currie et al. | 719/310 |
| 2004/0109413 A1 | 6/2004 | Heirholzer et al. | |
| 2004/0172639 A1 | 9/2004 | Luo et al. | |
| 2004/0215473 A1 | 10/2004 | Bhogi et al. | |
| 2004/0244004 A1 | 12/2004 | Pardon et al. | |
| 2005/0060169 A1* | 3/2005 | Gangadharan et al. | 705/1 |
| 2005/0240663 A1* | 10/2005 | Wolber et al. | 709/220 |
| 2005/0278223 A1* | 12/2005 | Petev et al. | 705/22 |
| 2006/0041662 A1 | 2/2006 | Georgiev et al. | |
| 2006/0075115 A1 | 4/2006 | Chitilian et al. | |
| 2008/0216090 A1* | 9/2008 | Currie et al. | 719/313 |

OTHER PUBLICATIONS

Demichiel, Linda, et al., "JSR 220: Enterprise JavaBeans,Version 3.0, Java Persistence API", *Sun Microsystems, EJB 3.0 Expert Group*, (May 2, 2006), Whole Document.

Shannon, Bill, "Java 2 Platform, Enterprise Edition Specification, v1.4", *Sun Microsystems*, Please send comments to: j2ee-spec-feedback@sun.com, (Nov. 24, 2003), Whole Document.

"6570P091 OA Mailed Dec. 28, 2007 for U.S. Appl. No. 10/861,267", (Dec. 28, 2007), Whole Document.

"6570P069 OA Mailed Apr. 15, 2008 for U.S. Appl. No. 10/860,839", (Apr. 15, 2008), Whole Document.

USPTO, "6570P069 OA Mailed Apr. 15, 2008 for U.S. Appl. No. 10/860,839", (Apr. 15, 2008), Whole Document.

USPTO, "6570P069 FOA Mailed Oct. 27, 2008 for U.S. Appl. No. 10/860,839", (Oct. 27, 2008), Whole Document.

USPTO, "6570P072 OA Mailed Aug. 11, 2008 for U.S. Appl. No. 10/856,249", (Aug. 11, 2008), Whole Document.

USPTO, "6570P075 OA Mailed Sep. 3, 2008 for U.S. Appl. No. 10/858,657", (Sep. 3, 2008), Whole Document.

USPTO, "6570P091 FOA Mailed Jul. 9, 2008 for U.S. Appl. No. 10/861,267", (Jul. 9, 2008), Whole Document.

*Final Office Action for* U.S. Appl. No. 10/858,657, Mailed Feb. 26, 2009, 19 pages.

Sun Microsystems, "Sun Trademarks", http://www.sun.com/suntrademarks/, (Printed / Downloaded Jan. 15, 2009), 1-6.

\* cited by examiner

PROGRAM OBJECT TO SUPPORT CONNECTION GENERATION

TECHNICAL FIELD

Embodiments of the invention generally relate to the field of client/server systems and, more particularly, to a system and method for a program object to support connection generation.

BACKGROUND

A conventional server system may include an application server that includes certain applications. The server system may provide interfaces to certain external resources. The server may include a J2EE™ Java™ 2 Enterprise Edition) compatible system. In operation of the server system, connections may be required between the applications and the external resources. To produce such connections, an entity may make a request to generate an instance of a connection factory, the connection factory being a program object to generate a connection between an application and an external resource.("J2EE" and "java" are trademarks of Sun Microsystems, Inc.)

However, a program object, such as an Enterprise Java-Bean™ (EJB™), may have multiple different properties that are specified for connection requirements. With the possible combinations of these properties, numerous different connection factories may be needed to provide all possible combinations of properties. ("Enterprise javaBean" and "EJB" are trademarks of Sun Microsystems, Inc.)

Further, the process of generating a connection factory may require numerous operations. For example, a connection factory may be a serializable object. Under common connection requirements, serialization will be required to bind each of the different connection factory objects. Further, when a connection factory is requested, deserialization using the serialized form of the object and the appropriate class loader is then done in order to return a new instance of the connection factory. These operations may be time-consuming and thus slow the process of establishing connections for server applications.

SUMMARY OF THE INVENTION

A system and method for a program object to support connection generation is described.

Under an embodiment of the invention, a method comprises establishing a first program object, the program object being designated as the connection factory for a plurality of program objects; receiving a request for a connection factory by the first program object; sending a request for the connection factory from the first program object; obtaining an instance of the connection factory; and deploying a program connection using the connection factory.

Under another embodiment of the invention a method comprises receiving a request for a connection factory from a program object, the connection factory to produce a connection between a program application on a server and an external resource, the request being received by a resource object factory in proxy for the server resource system; requesting a connection factory to produce the connection; receiving the connection factory; and returning the connection factory to the requesting program object.

Under another embodiment of the invention a server system comprises an application container, the application container comprising a program application; an interface with an external resource, the external resource to be connected to the program application; a resource system to provide for the connections between the program application and the external resource; and a resource object factory, the resource object factory to assist in the establishment of the connection between the program application and the external resource.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to server operations. Under an embodiment of the invention, a system may include a program object to support generation of connections.

Under an embodiment of the invention, a program object is provided to assist in generation of connections. The program object is to assist in the processing of requests for connections between a server system and various resources. Under an embodiment of the invention, a resource object factory acts as a proxy between an entity and a resource system for processing connections. Under an embodiment of the invention, the resource object factory acts to tune up and assist in the operation of a resource system and to manage the lifecycle of connection factories.

Under an embodiment of the invention, a resource system is a system for providing communications between containers on the server, each container being a container being an entity to provides life cycle management, security, deployment, and runtime services to program components, and resources such as JDBC connector, JMS connector, and connector container services. Under an embodiment of the invention, a resource object factory assists in the generation of connections, such as in supporting the operation of the resource system. Under an embodiment of the invention, a server may include a server that is compatible with the J2EE (Java 2 Enterprise Edition) specification, version 1.4, Nov. 24, 2003. Under an embodiment of the invention, the resource object factory may be utilized to assist in the provision of connections for the server in conformity with the J2EE Connector Architecture Specification (JCA), including version 1.0 Aug. 22, 2001 and version 1.5, Nov. 24, 2003.

According to an embodiment of the invention, in the establishment of a connection, an entity may request generation of an instance of a connection factory from a resource system and a JNDI (Java Naming and Directory Interface). A JNDI is described in the JNDI Application Programming Interface (API), version 1.2, Jul. 14, 1999, and the JNDI Server Provider Interface (SPI), version 1.3, Jul. 14, 1999. Under an embodiment of the invention, a resource object factory acts as a proxy between the entity and the resource system and the JNDI, acting to process connection factory requests. Under an embodiment, the resource object factory will be used by each resource reference object within the JNDI namespace in the generation of connection factories. A connection factory is generally an object that produces connection objects that enable a component to access a resource. Under an embodiment of the invention, each resource reference declares the resource object factory to be the object factory for the resource reference, and the resource object factory then acts as the recipient of connection factory requests.

The J2EE connector architecture provided by the JCA enables J2EE components to interact with enterprise information systems (EISs) and for the EISs to interact with J2EE components. A resource adapter is a component that implements the J2EE connector architecture for a specific EIS. A connector is a mechanism to provide connectivity to EISs, with a connector being specific to a particular EIS and consisting of the resource adapter and any application development tools for EIS connectivity. A resource adapter is generally stored in a resource adapter archive (RAR) file and can be deployed on any J2EE server to mediate communication between the server and the EIS via contracts.

Pursuant to the JCA, an Enterprise Java bean may specify certain elements that are otherwise optional in J2EE deployment. These objects are res-sharing-scope to indicate whether a connection to a resource manager is shareable or unshareable; res-auth to indicate whether there is a programmatic sign-on to an EIS; and non-transactional, which indicates whether the resource adapter may be involved in a global transaction, if any. With combinations of these properties (each having two possible values), it may be necessary to bind eight different connection factories. A connection factory is generally from type javax.resource.cci.ConnectionFactory, which is thus java.io.Serializable. Serialization describes the process of converting object instances into a linear stream of bytes (thus a serial data stream), which may be done for purposes of transferring, storing, or manipulating data. For each of such eight connection factories, serialization will occur each time any of these items is bound. Further, deserialization will occur each time there is a look up of one of such connection factories.

However, under the JNDI specification, it is also possible to bind objects of type reference instead of the serializable type that is specified for a connection factory. A reference object contains information, denoted as RefAddr properties to be stored within the reference object. The information may include the name of the object factory, which can be utilized to restore the object. Under an embodiment of the invention, the resource object factory is specified as an object factory for each relevant reference. In this way, the resource object factory acts as the recipient of each connection factory request, without requiring the serialization of the resource object factory on binding and the deserialization of a serialized object on look up. Under an embodiment of the invention, a connection factory that is provided is a Java object working in the same virtual machine as the resource object factory.

Under an embodiment of the invention, a resource object factory is enabled by making the object factory singleton. A singleton is a design pattern that supports creation of only one instance of a class. Therefore, the resource object factory will support the creation of a single factory object to operate as the connection factory for each reference.

Under an embodiment of the invention, normal bind and lookup operations may also then be modified to improve efficiency of operations. For example, utilizing the reference object, a bind operation for the connection factory may be replaced with an add to a given data structure. The lookup may then be replaced by getting the object from the given data structure. Under an embodiment of the invention, the name of the requested connection factory are included in the RefAddr properties specified under the JCA, these being the shareable property, the authority property, and the non-transaction property. The connection factory name thus will be:

RefAddr: valueOfShareableProperty+valueOfResAuthProperty+valueOfNonTransactionProperty+nameOfRequestedConnecionFactory Under an embodiment of the invention, each instance of a connection factory is configured by passing the connection factory an appropriate connection manager. Therefore, a connection factory then may be modified and controlled by controlling the underlying connection manager. For example, the connection manager may be started or stopped or the properties of the connection manager may be changed. The properties of a connection manager then may be changed through the JNDI. Under an embodiment of the invention, a managed connection factory wrapper (MCFWrapper) is bound at deployment time and contains properties needed for an underlying resource system. The managed connection factory wrapper includes the managed connection factory object, which will serve as the factory for connection factory objects. The managed connection factory wrapper is cached within the resource object factory after the start of a given connection factory, and thus a change of properties for the connection factory can be made by invoking appropriate methods of the resource object factory.

Figure 1:
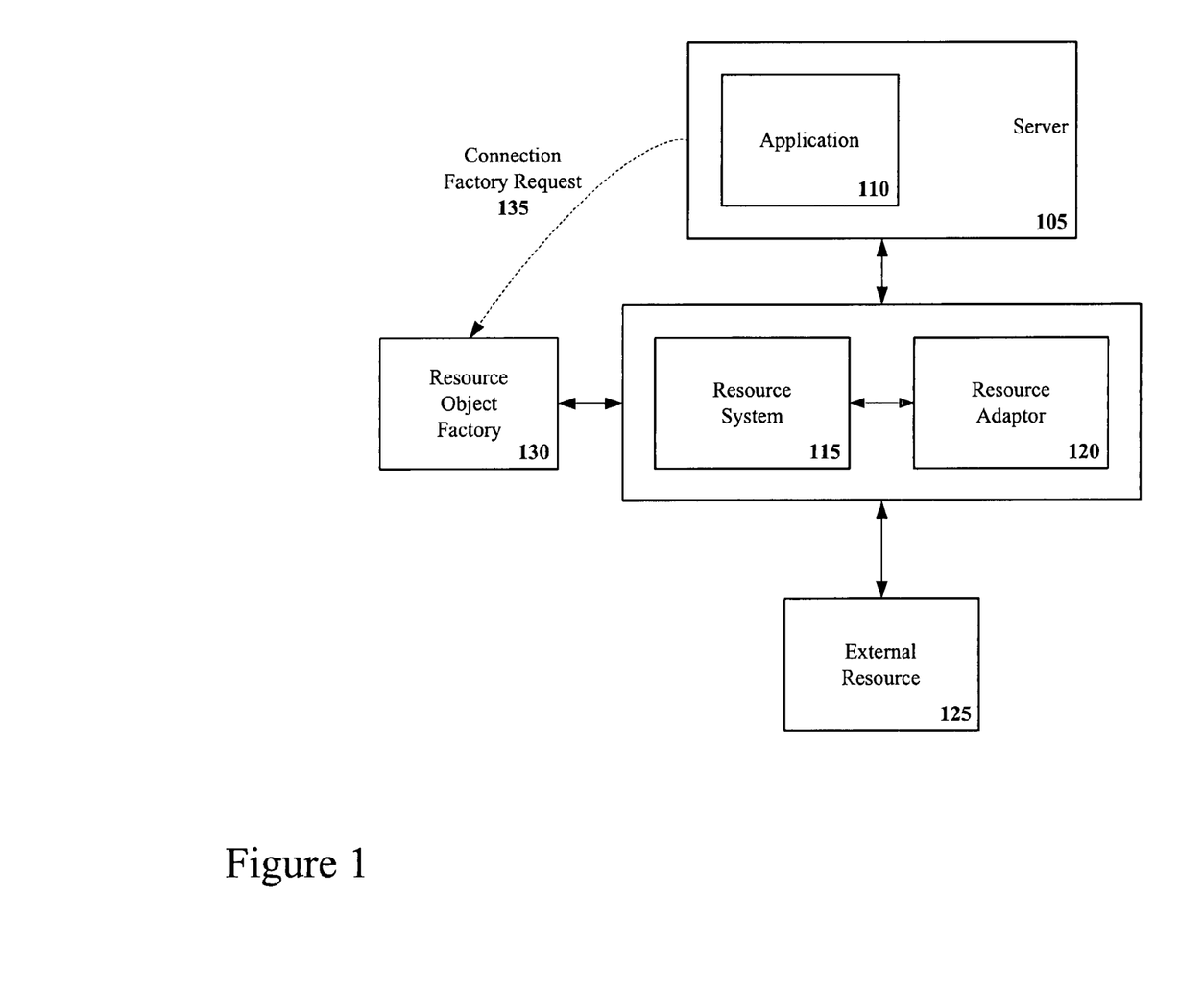
FIG. 1 is an illustration of an embodiment of a server utilizing a resource object factory to support a resource system.

FIG. 1 is an illustration of an embodiment of a server utilizing a resource object factory to support a resource system. In FIG. 1, an application server 105 includes an application 110. In FIG. 1, a resource system 115 is included to provide for connections between applications and resources, which in this instance may include a connection between the application 110 in application server 105 and an external resource 125, as shown connected by resource adapter 120. Under an embodiment of the invention, a resource object factory 130 is provided to assist the resource system 115 in the establishment of connections. The resource object factory 130 may be designated as the object factory for any reference. Under an embodiment of the invention, the resource object factory 130 acts as a proxy for receipt of a connection factory request 135.

Figure 2:
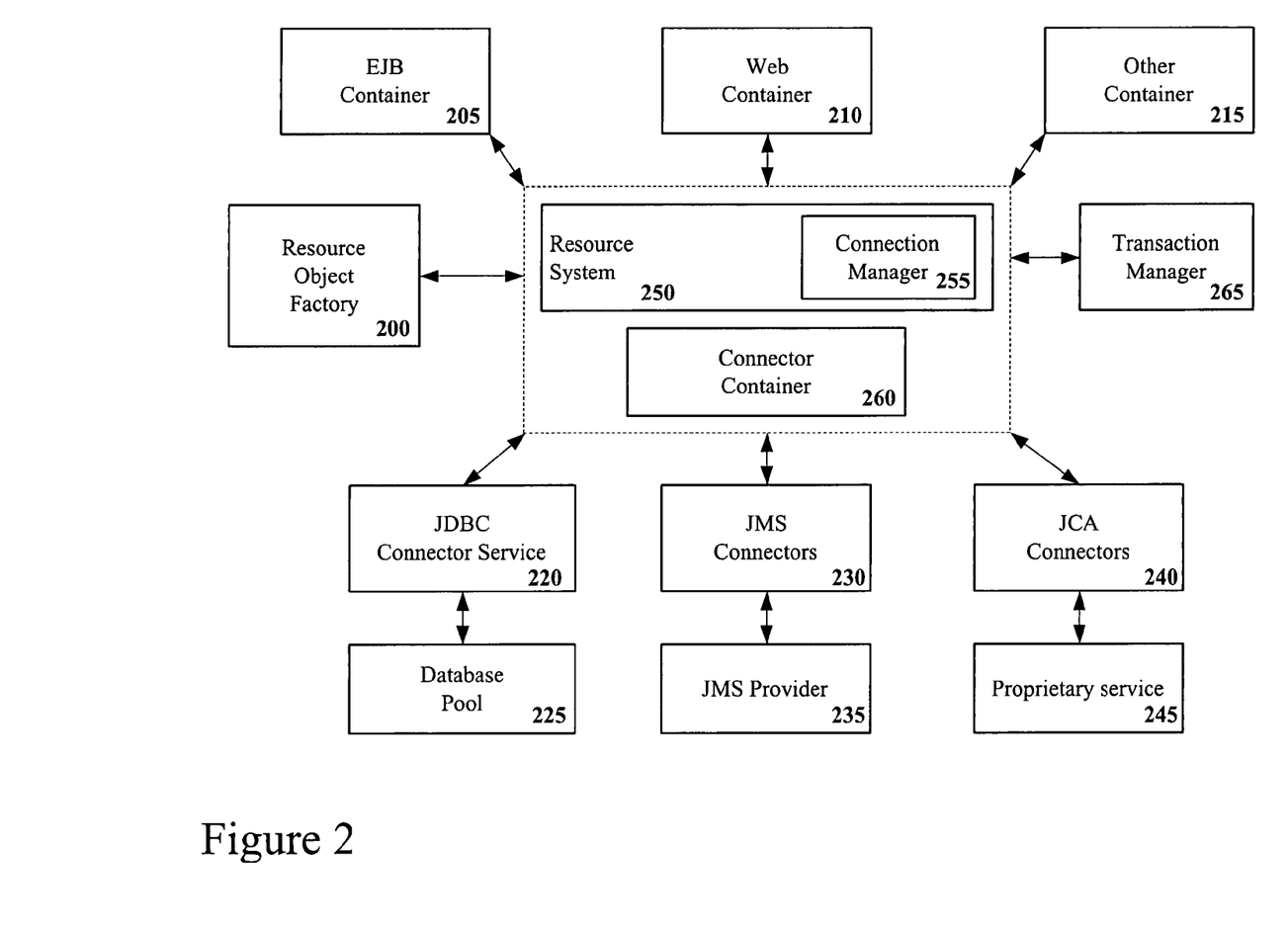
FIG. 2 is an illustration of an embodiment of a server utilizing a resource object factory.

FIG. 2 is an illustration of an embodiment of a server utilizing a resource object factory. In this illustration, program object containers include an enterprise Java bean (EJB) container 205, a web container 210, and another arbitrary container 215. External resources include a database pool 225 that may be connected using a JDBC (Java database connection) connector server 220, a JMS (Java message service provider) 235 that may be connected utilizing JMS connectors 230, and a proprietary service 245 that may be connected using JCA (Java connector architecture) connectors 240. The resource system 250 includes a connection manager 255, and utilizes a connector container 260 to store managed connections. A transaction manager 265 maintains a relationship with the resource system 250. Under an embodiment of the invention, a resource object factory 200 is present to assist the resource system 250 in the generation of connections between applications and resources. If a connection factory request is received, the resource object factory 250 acts as proxy for the request.

The JNDI architecture consists of the JNDI API and the JNDI SPI. The JNDI API allows Java applications to access a variety of naming and directory services. The JNDI SPI is then used by multiple service providers, including directory service providers. The JNDI Service Provider Interface (SPI) provides the means by which naming and directory services are integrated into the JNDI framework. This arrangement enables a variety of directory and naming services to be plugged in transparently to a Java application.

Figure 3:
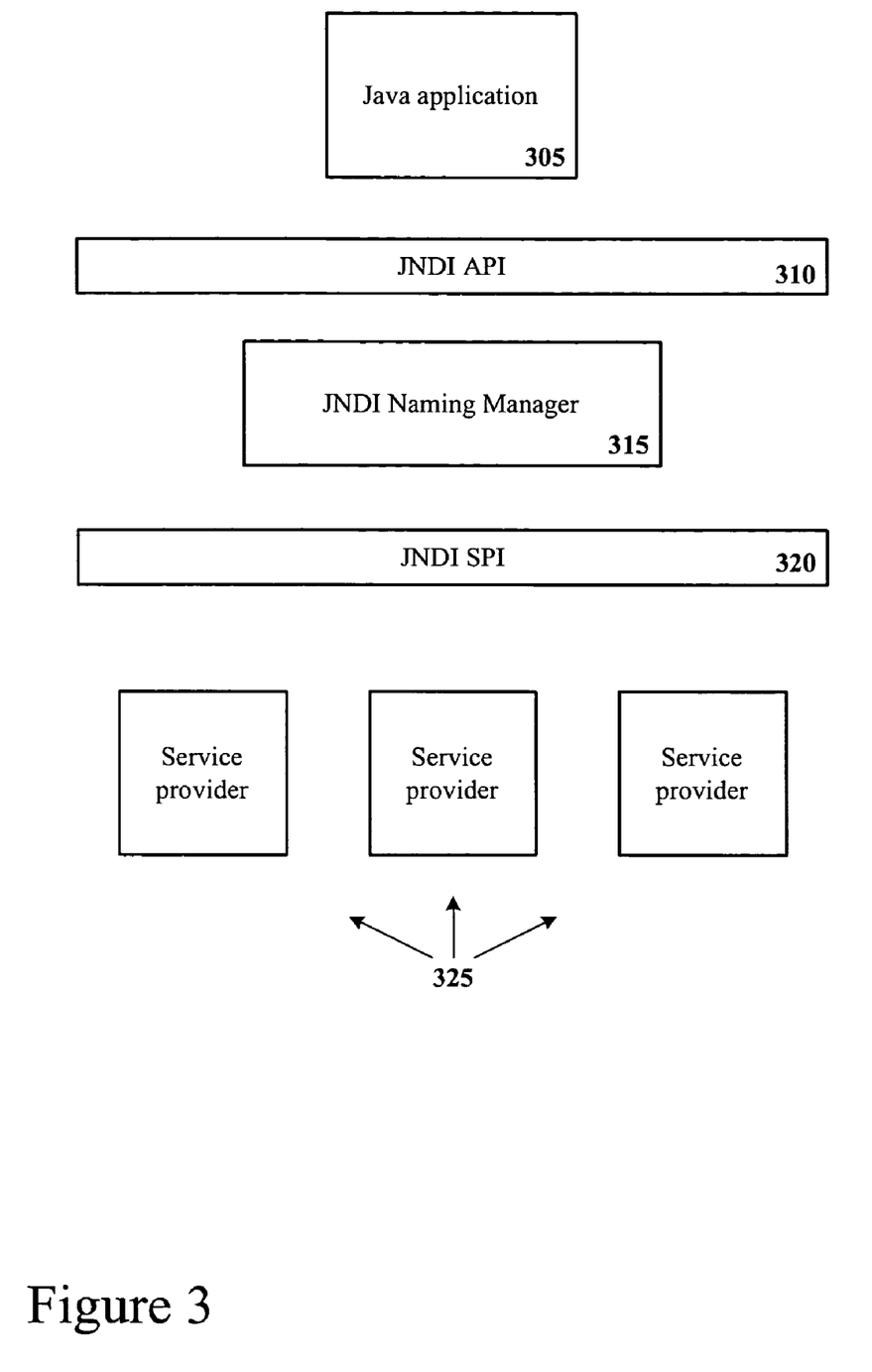
FIG. 3 is an illustration of JNDI interfaces and naming manager for an embodiment of the invention.

FIG. 3 is an illustration of JNDI interfaces and naming manager for an embodiment of the invention. In this illustration, a Java application 305 communicates with the JNDI naming manager via the JNDI API 310. Similarly, any of the illustrated service providers 325 would communicate with the JNDI naming manger 315 via the JNDI SPI 320. Under an embodiment of the invention, a request for a connection factory may be made to the JNDI naming manger and respectively to the resource object factory. However, under an embodiment of the invention, the JNDI properties may be used to modify connection factory processes. Using the reference type allowed by the JNDI API 310, a connection factory is implemented through the JDNI naming manager 315 without requiring the normal serialization and deserialization processes.

Figure 4:
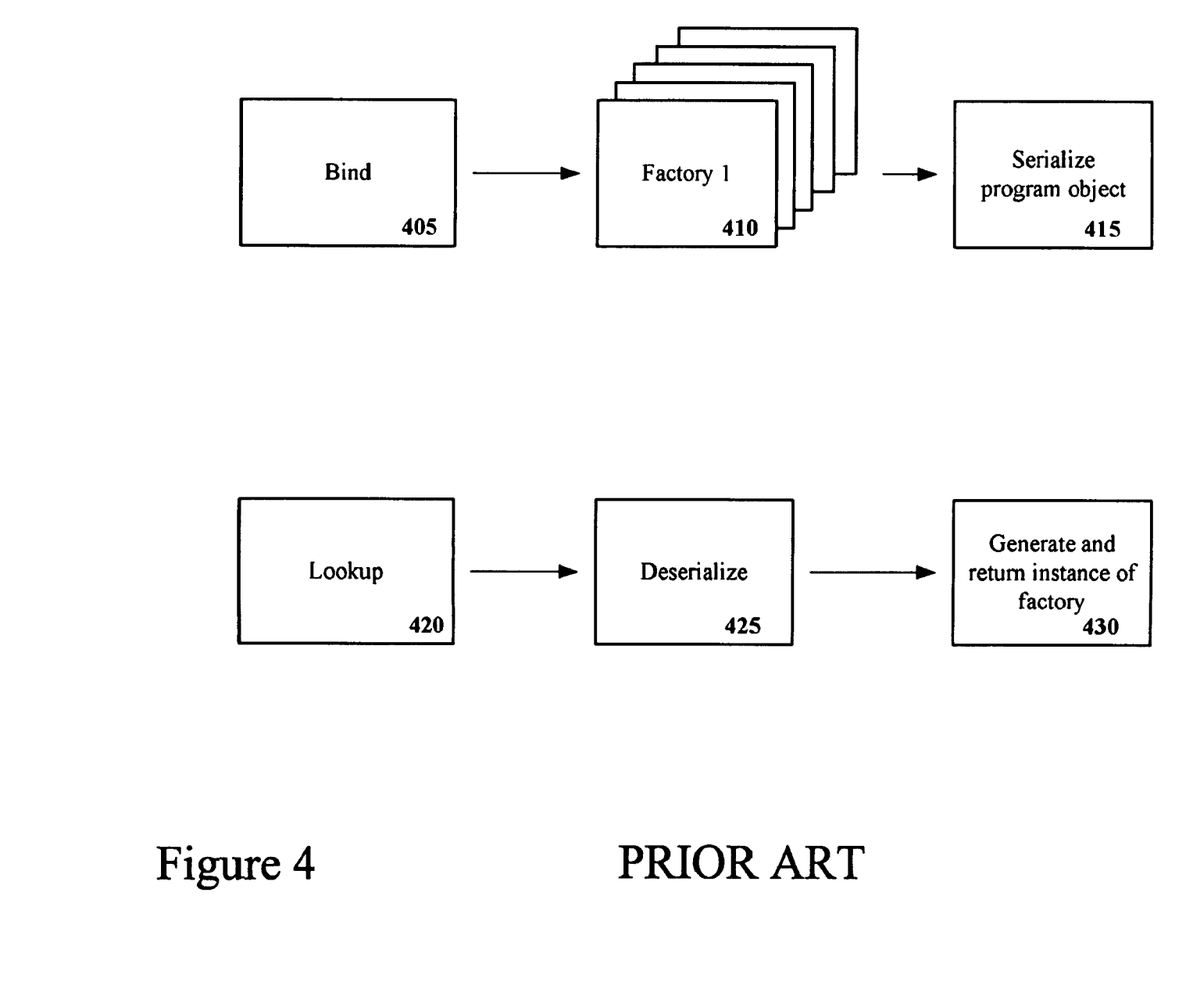
FIG. 4 is an illustration of a process of establishing a connection factory and generating an instance of the connection factory.

FIG. 4 is an illustration of a process of establishing a connection factory and generating an instance of the connection factory. In this illustration, there is a bind operation for the connection factory 405. However, a program object may include certain properties, as specified by the J2EE connection architecture. With the varying properties, there may be a number of different connection factories 410 needed to support the connection architecture. Each of the connection factories is serializable, and thus serialization 415 is required in the binding operation for each factory.

To generate an instance of a connection factory, there is a lookup operation 420. For each of the multiple connection factories, there is a deserialization operation 425, converting the serialized version of the program object data. The deserialized factory then may be utilized in the process of generating and returning an instance of the connection factory 430. As illustrated in FIG. 4, multiple operations are needed to generate the connection factory. A connection factory needs to be bound for each combination of properties for the program object, and each of these connection factories is then serialized. Then, a deserialization operation is required each time there is a request to generate an instance of a connection factory.

Figure 5:
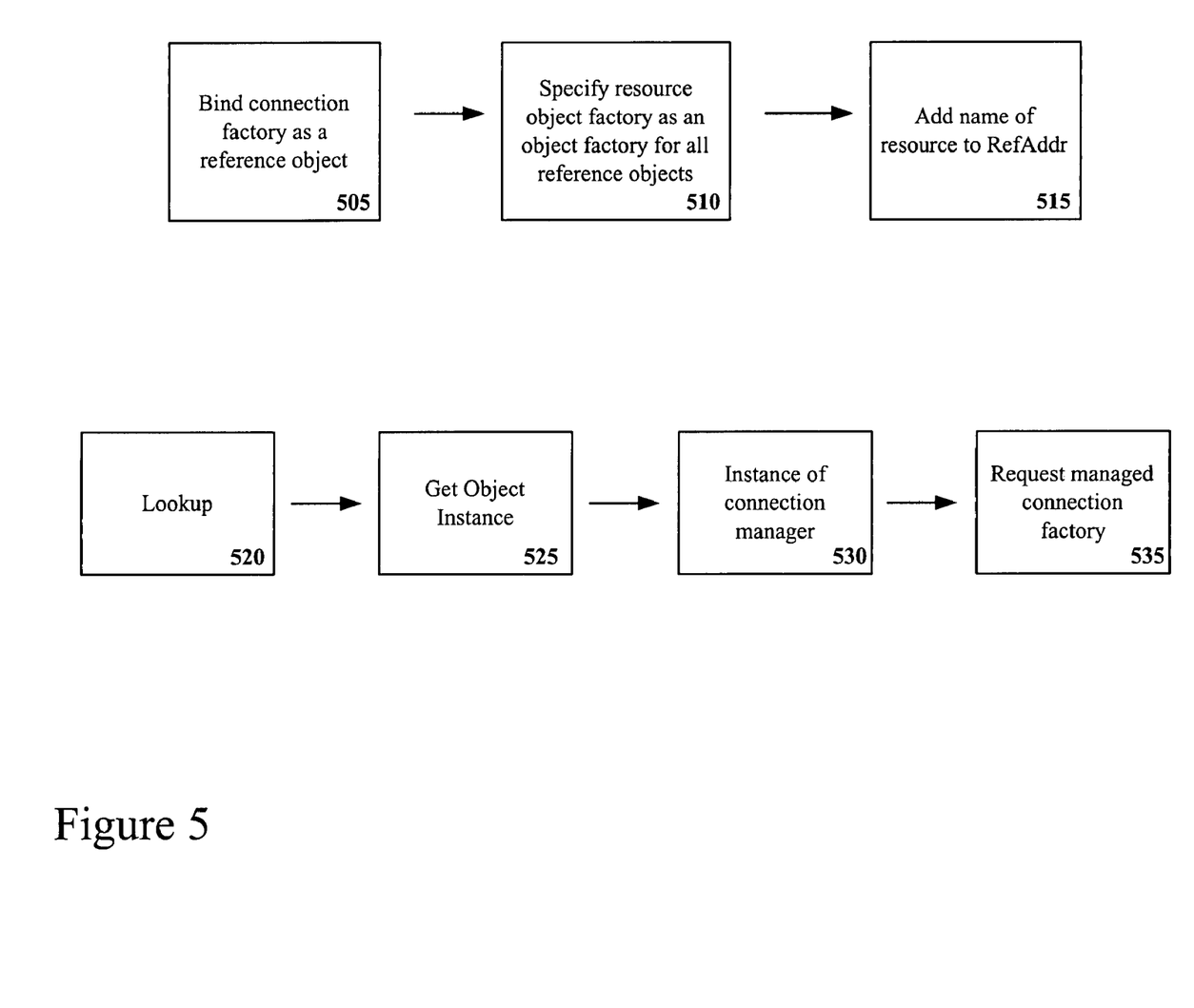
FIG. 5 is an illustration of an embodiment of the establishment of a connection factory utilizing a resource object factory.

FIG. 5 is an illustration of an embodiment of the establishment of a connection factory utilizing a resource object factory. In this illustration, a resource object factory is used to assist in generating connection factories without the need for excessive operations. In FIG. 5, the connection factory is bound as a reference object 505, and not as a serializable object. The resource object factory is then specified as the object factory for each reference 510. Instead of an expensive serializing operation for each connection factory, there is an add operation 515, in which the name of the resource is added to the properties of a reference object and thus a bind operation followed by serialization of the simple reference object, instead of the complex connection factory.

To deploy a connection factory, there is a lookup request 520, which, because of the establishment of a resource object factory, results in a get object instance request 525 to the resource object factory. There is then a request for an instance of the connection manager 530, and a request to create a connection factory using the connection manager 535. In the processes shown in FIG. 5, generation of a connection factory may be accomplished using the support of a resource object factory without the serialization and deserialization of the resource object.

Figure 6:
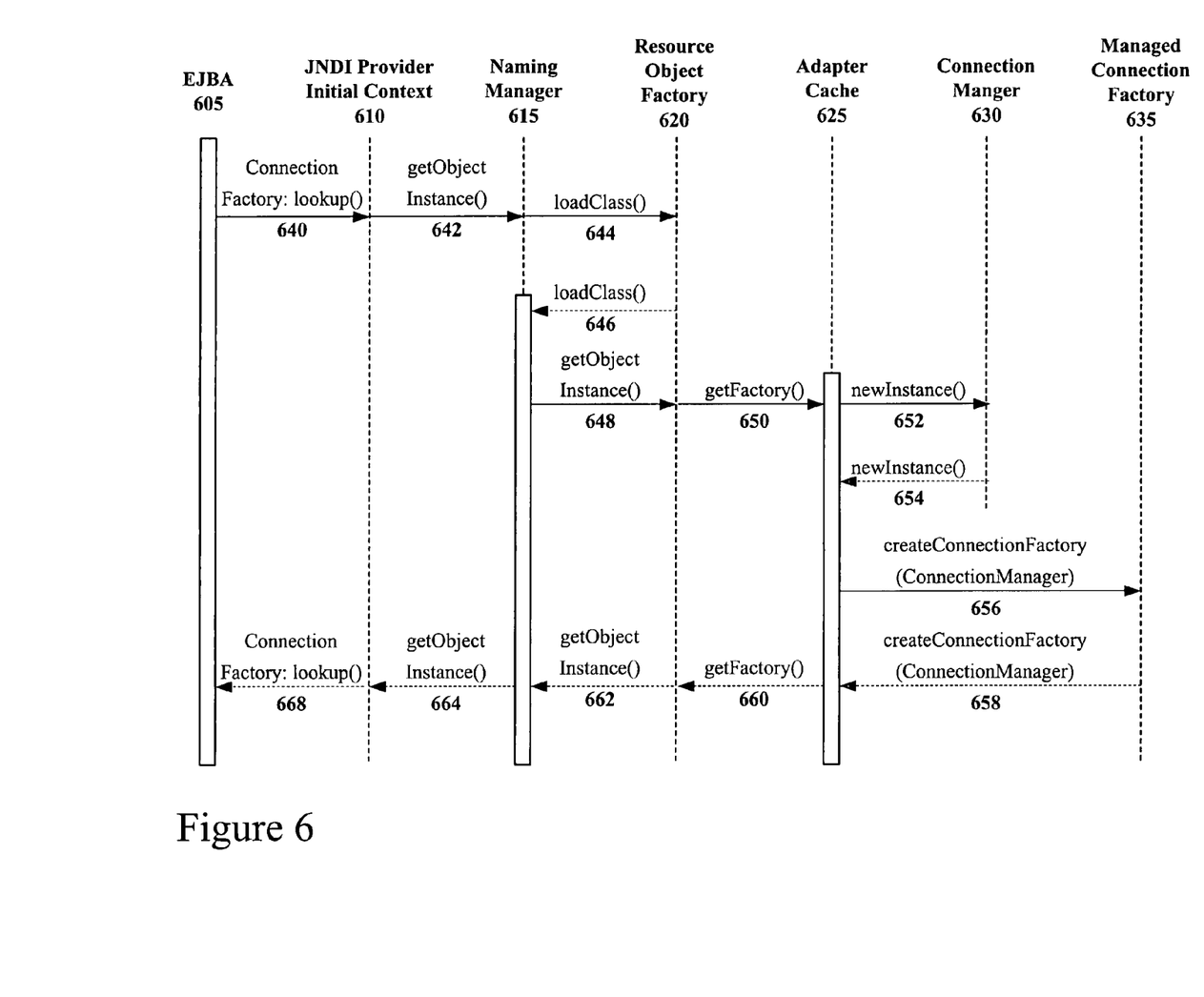
FIG. 6 is an illustration of an embodiment of a process for obtaining a connection factory.

FIG. 6 is an illustration of an embodiment of a process for obtaining a connection factory. In this illustration, a resource object factory has been specified as an object factory for the reference, thereby allowing a streamlined process for obtaining a connection factory. An enterprise Java bean (EJBA) 605 requests a connection factory lookup 640, with a resource object factory being designated as the object factory for the connection factory. According to an embodiment of the invention, the connection factory is bound as javax.naming.reference. The JNDI provider initial context 610 provides a get object instance request 642 to the JNDI naming manager 615. An initial context is generally configured to have bindings to useful starting contexts in different naming and directory systems. In this instance, the JNDI naming manager 615 loads 644 the class of the resource object factory. Under an embodiment of the invention, the resource object factory acts as the object factory for each resource reference in the JNDI namespace. Following the load class return 646, the JNDI naming manager 615 provides a get object instance request 648 to the resource object factory 620. The resource object factory 620 provides a get factory request 650 to an adapter cache 650, with the reference address of the reference object being used to determine which adapter cache will process the request. The adapter cache 625 then makes a new instance 652 of the connection manager 630. After the return of the new instance of the connection manager 654, the adapter cache provides a create connection factory request 656 to the managed connection factory 635, using the connection manager as an argument. The managed connection factory 635 acts as a factory for connection factories and managed connections. FIG. 6 then illustrates the returns for the create connection factory request 658, the get factory request 660, the get object instance request 662 and 664, and the connection factory lookup 668.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Embodiments may include a computer-readable medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:

establishing a first program object in a server system, the server system including a processor to execute instructions, the first program object being designated as an object factory for generation of a connection factory by each of a plurality of program objects in the server system, the first program object acting as a proxy to receive and handle all connection factory requests for a namespace of a JNDI (Java™ Naming and Directory Interface);

receiving a request for a connection factory from a program application at the JNDI, the JNDI to direct the request to the first program object as the designated object factory for the requested connection factory, the request being received by the first program object as the proxy for all connection factory requests; and generating a request for the connection factory from the first program object, the first program object directing the request for the connection factory to an adapter cache to process the request, wherein the adapter cache is to generate an instance of a connection manager and to provide a create connection factory request to a managed connection factory using the instance of the connection manager as an argument;

receiving an instance of the connection factory from the adapter cache at the first program object in response to the request for the connection factory generated by the first program object, and returning the connection factory to the JNDI; and returning the connection factory from the JNDI to the program application.

2. The method of claim 1, wherein the connection factory is not serializable.

3. The method of claim 1, wherein receiving the request for a connection factory comprises receiving a look up request at the JNDI and sending a get object instance request to the first program object.

4. The method of claim 1, further comprising generating a connection using the received connection factory and deploying the connection between the program application and an external resource, wherein the connection complies with the JAVA™ platform 2 enterprise edition (J2EE™) connector architecture specification (JCA).

5. The method of claim 4, wherein the external resource comprises an enterprise information system (EIS).

6. The method of claim 1, wherein the first program object is generated to only support the creation of a single factory object to operate as requested connection factory.

7. The method of claim 1, further comprising modifying properties of the connection factory by modifying the instance of the connection manager.

8. The method of claim 1, wherein the first object is a resource object factory, and wherein the resource object factory is designated to receive object factory requests from each resource reference in the namespace of the JNDI.

9. A method comprising:

receiving a request to obtain a connection factory from a first program object in a server system, the server system including a processor to execute instructions, the connection factory to produce a connection between a program application on a server and an external resource, the request to obtain the connection factory being made by the first program object in response to a request for a connection factory from the program application via a JNDI (Java™ Naming and Directory Interface), the request for the connection factory being intended for a namespace compliant with JNDI application programming interface (API) and the first program object acting as a proxy for a server resource system for all connection factory requests in the namespace of the JNDI, the first program object directing the request to obtain the connection factory to an adapter cache to process the request;

in response to the request to obtain a connection factory, the adapter cache generating a request to create a connection factory to produce the connection, generating the request to create the connection factory including generating a connection manager and providing the request to create the connection factory to a managed connection factory using the connection manager as an argument;

receiving the connection factory from the adapter cache at the first program object in response to the request to obtain a connection factory; and returning the received connection factory to the JNDI for return to the requesting program application.

10. The method of claim 9, further comprising managing the lifecycle of the received connection factory.

11. The method of claim 9, wherein receiving the request to obtain the connection factory does not result in a deserialization operation.

12. The method of claim 9, wherein the received request to obtain the connection factory is in the form of a request to get an object from a data structure.

13. The method of claim 9, further comprising generating a connection using the connection factory and deploying the connection between the program application and an external resource, wherein the connection complies with the Java™ Platform 2 Enterprise Edition (J2EE™) connector architecture specification (JCA).

14. The method of claim 13, wherein the external resource comprises an enterprise information system (EIS).

15. The method of claim 9, wherein the first program object is a resource object factory.

16. A server system comprising:

a processor to execute instructions;

an application container to store applications, the application container including a program application to be executed;

an interface with an external resource, the external resource to be connected to the program application;

a resource system to provide for connections between the program application and the external resource; and a resource object factory, the resource object factory to assist in the establishment of a connection between the program application and the external resource, the resource object factory to be designated as an object factory for generation of a connection factory, the resource object factory acting as a proxy between the entity requesting the connection and the resource system for all connection factory requests for a namespace of a JNDI (Java™ Naming and Directory Interface), the resource object factory to receive requests for connection factories from the JNDI as proxy for connection factory requests;

wherein the resource object factory is to receive a first request to obtain a connection factory from the program application via the JNDI, and is to provide a second request to get the connection factory to an adapter cache, the adapter cache to generate a request to create the connection factory by generating a connection manager and provide the request to create the connection factory to a managed connection factory using the connection manager as an argument;

wherein the resource object factory is to receive the connection factory from the adapter cache in response to the second request to get the connection factory; and wherein the JNDI is to receive the connection factory from the resource object factory and the JNDI is to return the connection factory to the program application.

17. The server system of claim 16, wherein the resource object factory operates to bind the connection factory by adding to a data structure and operates to look up the connection factory by getting an object from the data structure.

18. The server system of claim 16, wherein the resource object factory is declared to be the object factory for all reference objects within the JNDI namespace.

19. The server system of claim 16, wherein the connection factory is declared to be a JAVA™ reference type object.

20. The server system of claim 16, wherein the connection factory is not serializable.

21. The server system of claim 20, wherein the received connection factory is utilized to generate the connection factory for deployment between the program application and an external resource, and wherein the connection between the program application and the external resource complies with the Java™ Platform 2 Enterprise Edition (J2EE™) connector architecture specification (JCA).

22. The server system of claim 21, wherein the external resource comprises an enterprise information system (EIS).

23. A computer-readable medium having stored thereon data representing sequences of instructions that, when executed by a processor, cause the processor to perform operations comprising:

establishing a first program object in a server system, the server system including a processor to execute instructions, the first program object being designated as an object factory for generation of a connection factory by each of a plurality of program objects in the server system, the first program object acting as a proxy to receive and handle all connection factory requests for a namespace of a JNDI (Java™ Naming and Directory Interface);

receiving a request for a connection factory from a program application at the JNDI, the JNDI to direct the request to the first program object as the designated object factory for the requested connection factory, the request being received by the first program object as the proxy for all connection factory requests;

generating a request for the connection factory by the first program object, the first program object directing the request for the connection factory to an adapter cache to process the request, wherein the adapter cache is to generate an instance of a connection manager and to provide a create connection factory request to a managed connection factory using the instance of the connection manager as an argument;

receiving an instance of the connection factory from the adapter cache at the first program object in response to the request for the connection factory generated by the first program object, and returning the connection factory to the JNDI; and returning the connection factory from the JNDI to the program application.

24. The computer-readable medium of claim 23, wherein the requested connection factory is not serializable.

25. The computer-readable medium of claim 23, wherein receiving the request for a connection factory comprises receiving a look up request at the JNDI and sending a get object instance request to the first program object.

26. The computer-readable medium of claim 23, further comprising instructions that, when executed by the processor, cause the processor to perform operations comprising:

generating a connection using the connection factory and deploying the connection between the program application and an external resource, wherein the connection complies with the Java™ Platform 2 Enterprise Edition (J2EE™) connector architecture specification (JCA).

27. The computer-readable medium of claim 26, wherein the external resource comprises an enterprise information system (EIS).

28. The computer-readable medium of claim 23, wherein the first program object is established to only support the creation of a single factory object to operate as a requested connection factory.

29. The computer-readable medium of claim 23, further comprising instructions that, when executed by the processor, cause the processor to perform operations comprising modifying properties of the connection factory by modifying the instance of the connection manager.

30. The computer-readable medium of claim 23, wherein the first object is a resource object factory, and wherein the resource object factory is designated to receive object factory requests from each resource reference in the namespace of the JNDI.

31. A computer-readable medium having stored thereon data representing sequences of instructions that, when executed by a processor, cause the processor to perform operations comprising:

receiving a request to obtain a connection factory from a first program object in a server system, the server system including a processor to execute instructions, the connection factory to produce a connection between a program application on a server and an external resource, the request to obtain the connection factory being made by the first program object in response to a request for a connection factory from the program application via a JNDI (Java™ Naming and Directory Interface), the request for the connection factory being intended for a namespace compliant with JNDI application programming interface (API) and the first program object acting as a proxy for a server resource system for all connection factory requests in the namespace of the JNDI, the first program object directing the request to obtain the connection factory to an adapter cache to process the request;

in response to the request to obtain a connection factory, the adapter cache generating a request to create a connection factory to produce the connection, generating the request to create the connection factory including generating a connection manager and providing the request to create the connection factory to a managed connection factory using the connection manager as an argument;

receiving the connection factory from the adapter cache at the first program object in response to the request to obtain a connection factory; and returning the received connection factory to the JNDI for return to the requesting program application.

32. The computer-readable medium of claim 31, further comprising instructions that, when executed by the processor, cause the processor to perform operations comprising managing the lifecycle of the received connection factory.

33. The computer-readable medium of claim 31, wherein receiving the request to obtain the connection factory does not result in a deserialization operation.

34. The computer-readable medium of claim 31, wherein the received request to obtain the connection factory is in the form of a request to get an object from a data structure.

35. The computer-readable medium of claim 31, further comprising instructions that, when executed by the processor, cause the processor to perform operations comprising:

generating a connection using the connection factory and deploying the connection between the program application and an external resource, wherein the connection complies with the Java™ Platform 2 Enterprise Edition (J2EE™) connector architecture specification (JCA).

36. The computer-readable medium of claim 35, wherein the external resource comprises an enterprise information system (EIS).

37. The computer-readable medium of claim 31, wherein the first program object is a resource object factory.

* * * * *

UNITED STATES PATENT AND TRADEMARK OFFICE
CERTIFICATE OF CORRECTION

PATENT NO.      : 7,594,237 B2                                   Page 1 of 1
APPLICATION NO. : 10/858661
DATED           : September 22, 2009
INVENTOR(S)     : Tankov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Twenty-eighth Day of September, 2010

David J. Kappos
*Director of the United States Patent and Trademark Office*